United States Patent [19]
Hemdal

[11] 3,840,707
[45] Oct. 8, 1974

[54] INTERMEDIATE EXCHANGE FOR DIGITAL SIGNALS, FOR CONNECTION OF ONE OF A NUMBER OF INLETS TO A SPECIFIC OUTLET OF A NUMBER OF OUTLETS

[75] Inventor: Goran Anders Henrik Hemdal, Skarholmen, Sweden

[73] Assignee: Telefonaktiebolaget L M Ericsson, Stockholm, Sweden

[22] Filed: Dec. 18, 1972

[21] Appl. No.: 316,410

[30] Foreign Application Priority Data

Dec. 22, 1971 Sweden ............................ 16471/71

[52] U.S. Cl. ............................................ 179/15 AQ
[51] Int. Cl. ............................................ H04j 3/00
[58] Field of Search ...... 179/15 AQ, 15 AT, 18 GF, 179/18 J, 15 BA

[56] References Cited

UNITED STATES PATENTS

| | | | |
|---|---|---|---|
| 3,643,030 | 2/1972 | Sparrgnoahl | 179/15 BA |
| 3,644,679 | 2/1972 | Tallegas | 179/15 AQ |
| 3,715,505 | 2/1973 | Gordon | 179/15 AQ |
| 3,737,586 | 6/1973 | Johnson | 179/15 AQ |

*Primary Examiner*—David L. Steward
*Attorney, Agent, or Firm*—Hane, Baxley & Spiecens

[57] ABSTRACT

An intermediate exchange for digital signals, especially PCM-signals has a number of inlets (incoming links) and an equal number of outlets (outgoing links) which are time- and space-divided. For each inlet to the exchange a storage block is provided which comprises a number of link address registers for storing the value of the desired outgoing link, a number of channel address registers for storing the value of the desired channel in the outgoing link and a binary information word register for storing the value of the PCM-word. The number of the respective registers is equal and equal to the number of channels of each inlet to the exchange. A stepping clock counts the address values of the channels sequentially and a clock address value together with the value of a channel address register are compared and upon coincidence the value of the associated link address register together with the value of the associated information word register are fed to a decoder for delivering the information word, for example, the PCM-word to the desired outlet (outgoing link).

2 Claims, 3 Drawing Figures

INTERMEDIATE EXCHANGE FOR DIGITAL SIGNALS, FOR CONNECTION OF ONE OF A NUMBER OF INLETS TO A SPECIFIC OUTLET OF A NUMBER OF OUTLETS

The present invention relates to an intermediate exchange for digital signals, for example PCM signals, for connection of one of a number of inlets to a specific outlet of a number of outlets, said inlets and outlets being both time- and space-divided, in which intermediate exchange a binary information word is stored together with the associated channel address and link address which define the desired time- and space-divided outlet and are selected by a marker, the write-in and read-out of the information words taking place cyclically.

An intermediate exchange for transmission of PCM signals from incoming links to outgoing links is previously known through, for example, Swedish Pat. No. 227,453. In such an exchange according to which digital signals in the form of PCM words from a number of incoming links are transmitted to predetermined outgoing links by means of addressing. The switching network required according to conventional techniques for the transmission is here replaced by electronic memories and registers, one line in an address memory being associated with each channel incoming to the exchange on each incoming link. Characteristic of this known intermediate exchange is that it contains a switching memory consisting of a number of matrices equal to the number of incoming links. With each of the incoming links, accordingly, is associated one matrix in the memory, which matrix contains a number of memory element groups equal to the number of outgoing links multiplied with the number of channels in each link. By means of a central stepping clock the switching memory is read out sequentially and channelwise in all outgoing links simultaneously. This known intermediate exchange is suited for use for a given number of links. However, when there is an increase of the number of links the fact that the switching memory for selection of a route in the exchange is not fully utilized leads to unnecessary expenditures.

An object of the present invention is to achieve an intermediate exchange of the type in which the memory space is optimally utilized.

Figure 1:
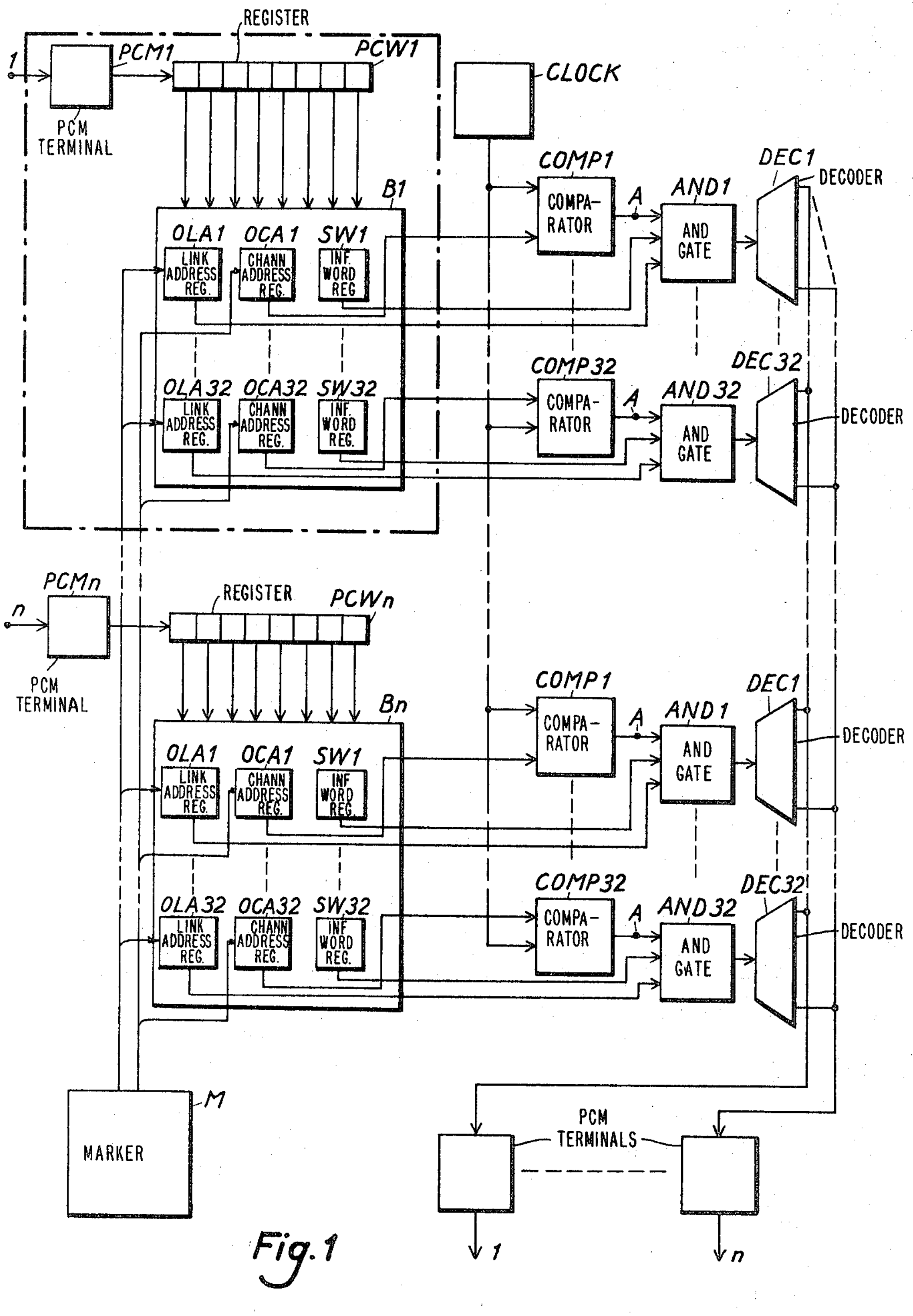
Figure 2:
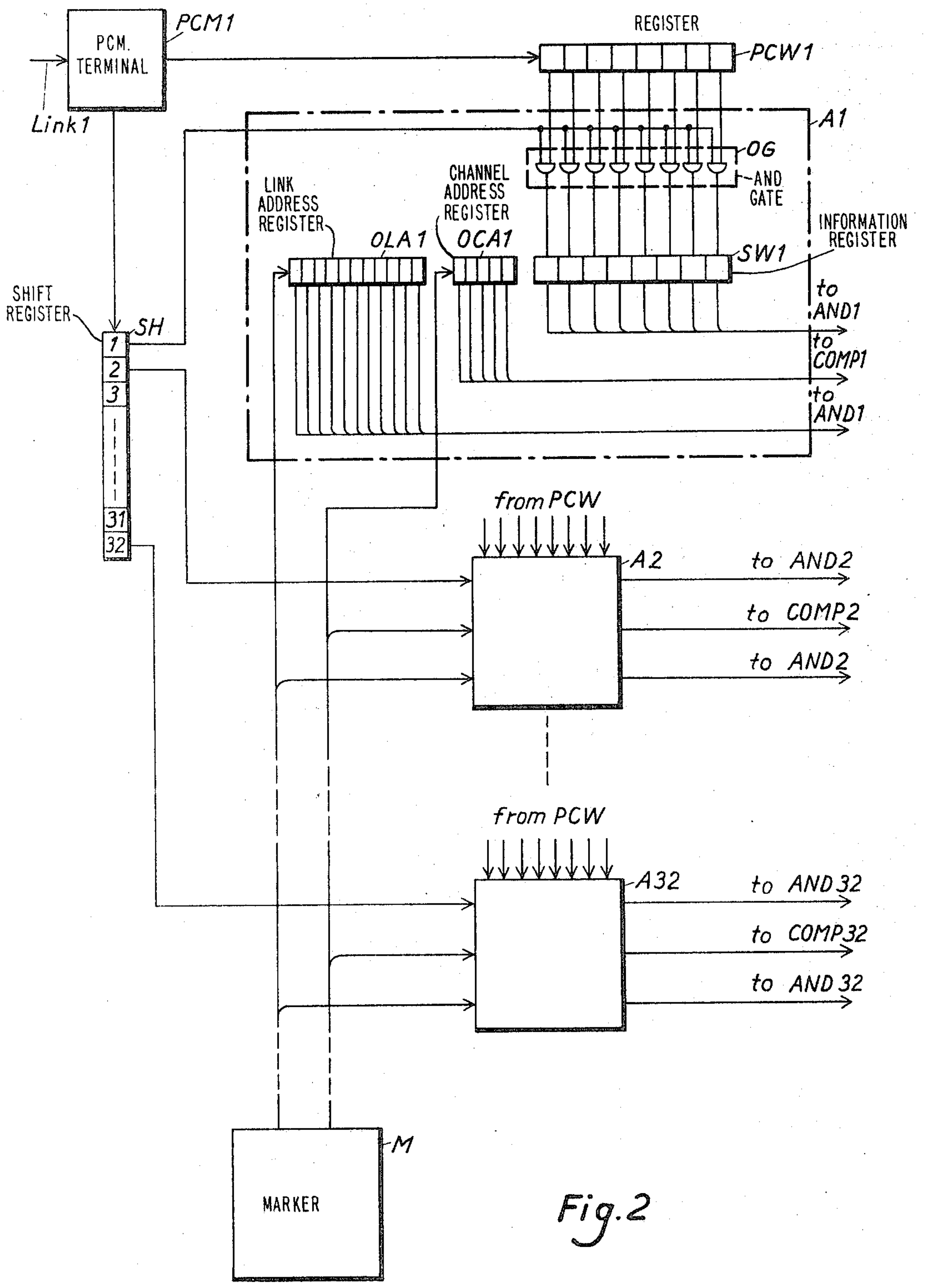
Figure 3:
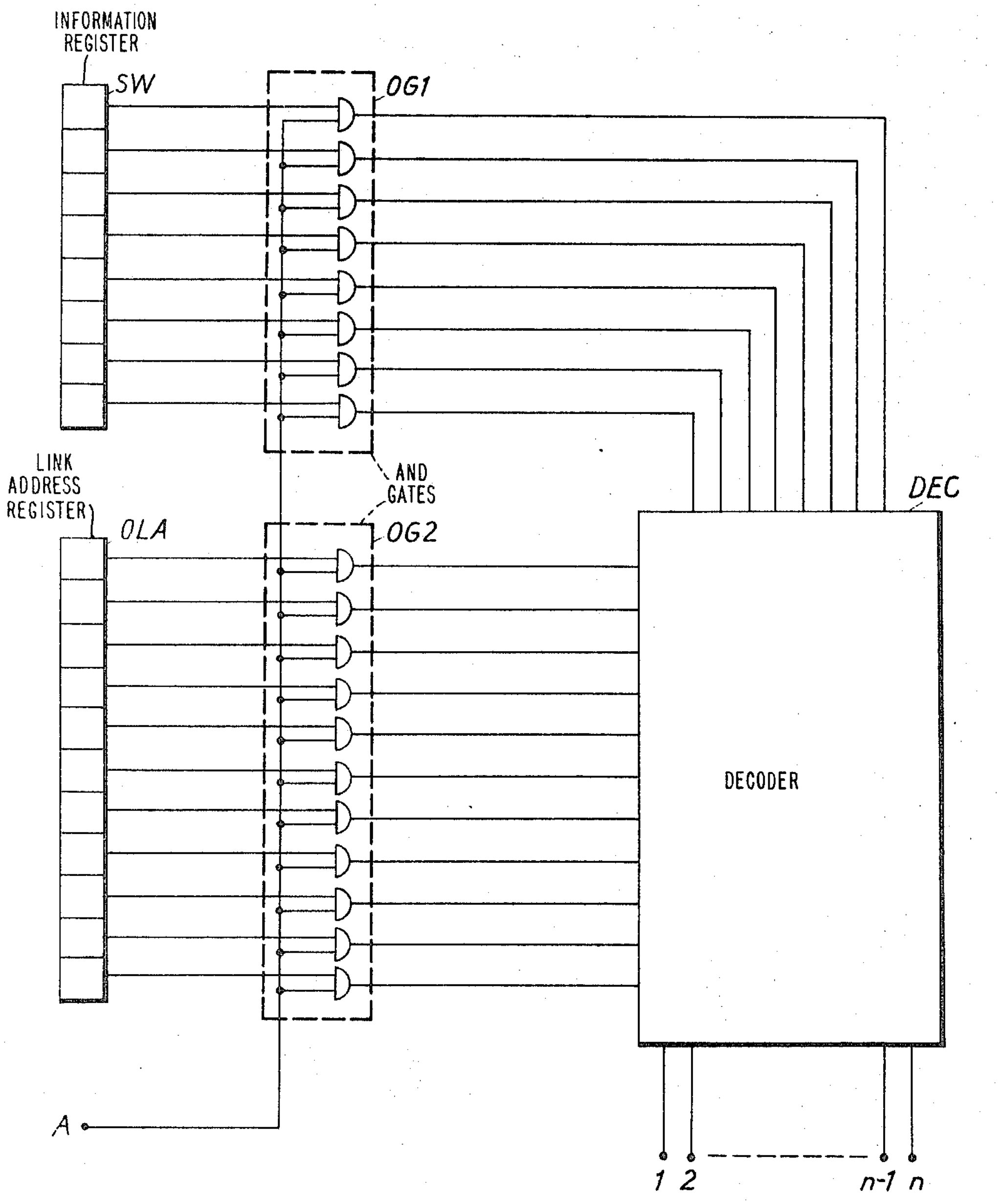

The invention, the characteristics of which appear from the appended claims, will be described with reference to the accompanying drawings, in which FIG. 1 shows a block diagram for a digital intermediate exchange according to the invention. FIG. 2 shows a block diagram for the elements associated with an incoming link and corresponding to the elements within the dashed area of FIG. 1. FIG. 3 shows a block diagram for a number of blocks forming part of the intermediate exchange according to FIG. 1.

In FIG. 1 the incoming and outgoing links of the exchange are denoted by 1, ..., *n*. A link is herein defined to mean the physical circuit which is connected to the exchange and transfers a number of time division multiplex PCM channels according to known principles. In the present case it is assumed that a number $n = 2{,}048$ links are connected to the intermediate exchange and that each link contains 32 time division multiplex channels. Each incoming link is connected to a terminal PCM1 – PCM*n* in which the incoming PCM words are converted into parallel form as symbolized by the registers PCW1 – PCW*n*. When all eight bits of a PCM word have been received, they are transmitted to register equipments B1 –B*n*, each of which is associated with an incoming link. The register equipments B1 – B*n* are all identical, each containing a number of link address registers OLA1 – OLA32, a number of channel address registers OCA1 – OCA32, the number of channel address registers OCA1 – OCA32 corresponding to a number of channels in a link, and a number of information registers SW1 – SW32 for storage of PCM information words received from registers PCW1 – PCW*n*. The link address and channel address information is inserted in the associated registers with the aid of a marker M of known construction for setting up of the telecommunication circuit (see, for example, Ericsson Technics, No. 2, 1963, pp. 164–165). According to the example each link address register contains 11 bit positions, so that $2^{11} = 2{,}048$ different address words can be stored in this register corresponding to each of the 2,048 outgoing links from the exchange. Each channel address register in the units B1 – Bn contains, according to the example, five bit positions, so that $2^5 = 32$ different bit positions can be stored in this register corresponding to each of the 32 time division multiplex channels in an outgoing link. The incoming information words are stored in the information word registers SW1– SW32 in the order in which they arrive at the PCM equipment, one information register being associated with each of the channels.

For transmission of the PCM words to the desired outgoing links and channels there is, according to the invention, a clock register CLOCK, a comparator circuit COMP and a logic circuit AND for each of the channels of the links in each register equipment, as shown schematically in FIG. 1. The clock register CLOCK consists of a stepping clock which is common to all register equipments B1 – B*n* and the outlet of which is connected to one inlet of each of the comparator circuits COMP1 – 32, while to their second inlet is connected the outlet of the channel address registers OCA1 – 32 in the respective register equipments. On coincidence between the value of the clock register and the value of a channel address register, a signal is obtained on the outlet of the comparator circuit. This outlet is connected to one inlet of a number of AND gates, which are symbolized in FIG. 1 by the block AND and will be more fully described in connection with FIG. 3. To the block AND are also connected the outlets from the information word register SW1 and the link address register OLA1, as from FIG. 2. When the outlet A of the comparator circuit COMP1 is activated, the block AND will pass the information from the registers SW1 and OLA1 to the decoder DEC1. In the latter the address of the desired outgoing link is decoded for each channel for which the comparator outlet has been activated. Thus, each channel will be transmitted to its respective desired outgoing link 1, ..., *n*.

The stepping clock contains, according to the example, five binary positions and counts in succession the values 00000, 00001, 00010, ....., 11110, 11111, 00000, ..... . It is these values which are compared in the comparator circuit COMP with the values in the channel address register OCA forming part of each register equipment B1 – B*n* (altogether 32 registers for each equipment). When the number of bits in the clock register is five, there will be $2^5 = 32$ different binary values to be counted corresponding to all channels in an outgoing link. Since the channels are time-divided, $n$ channels will always be simultaneously transferred through the intermediate exchange for a given value on the clock register CLOCK. Furthermore, for each equipment B1 – B$n$ one and only one outlet A of the comparator circuits COMP1 – 32 will be activated, since the channel address registers OCA1 – 32 within each register equipment have different addresses for every time position of the clock register.

The function of the intermediate exchange will be more fully described with reference to FIG. 2, which shows in greater detail the equipment within the block, surrounded by dashed lines in FIG. 1, associated with an incoming link, for example link 1. PCM1 denotes a PCM terminal of known type, described in L M Ericsson's publication "30 channel PCM terminal, ZAK 30/32" (see especially FIG. 2.3 in that publication). The terminal contains a shift register SH which is stepped forward one step for each incoming channel. On stepping of the shift register SH the AND gates OG associated with the respective channels are successively activated so that the information word associated with the channel and stored in the register PCW is successively fed to the registers SW1 – 32 associated with the respective incoming channel. In the link address registers OLA1 – OLA32 and in the channel address registers OCA1 – OCA32 the marker M has inscribed the address of, respectively, the outgoing link and of the channel associated with the incoming PCM words of an incoming link. In the receiving units A1 – A32, accordingly, address information corresponding to the desired outgoing link is inscribed in the respective link address registers OLA, and in the channel address registers OCA1 – OCA32 there is inscribed one of the 32 values 00000 – 11111 defining one of the 32 channels in any of the outgoing links. All units A1 – A32 are otherwise of identical form.

When the clock register CLOCK has assumed, for example, the value 00000, the outlet of the one of the comparator circuits COMP1 – 32 connected to the associated channel register OCA1 – 32 of which the corresponding value is inscribed will be activated. In the same way the outlets of the other comparator circuits associated with the same channel in the remaining links will be activated. The result is that the control logic in the block AND associated with these activated outlets A will open and pass the values of the respective link address register OLA and information word register SW to the respective decoders DEC1 – 32 (see FIG. 1). The latter, in dependence on the decoded link address, feed the PCM word received from the information word register to the desired outgoing link. When the clock register thereafter steps forward one step and assumes the value 00001, all information words for which the channel address registers OCA1 – 32 contain the value 00001 etc. are read out. It is thus clear that, in dependence on the stepping of the clock register CLOCK, all outgoing links 1, ....., $n$ will receive bit information from the same channel address completely synchronously.

The comparator circuit COMP1 – 32 consists of known logic circuits, such as EXCLUSIVE-OR gates, to one inlet of which the outlet of the clock register positions and to the other inlet of which the outlet of the positions in the channel address register are connected. On the outlet of an AND circuit the inlets of which have been connected to each of the outlets of the EXCLUSIVE-OR gates said activation signal can be obtained.

FIG. 3 illustrates the structure of the block AND according to FIG. 1. In the figure SW and OLA denote any one of the information registers SW1 – SW32 and an associated link address register OLA1 – OLA32 respectively, in one of the units B1 – B$n$ in FIG. 1. The outlets of each register SW and OLA are connected to one inlet of a number of AND gates OG1 and OG2, respectively. The second inlet of each of these AND gates is connected via a common connection to the outlet A of the comparator circuit COMP. When this outlet is activated, all AND gates OG1 and OG2 will pass the binary values stored in all positions of the registers SW and OLA, the which values are thereby fed to the eight plus 11 inlets of the decoder DEC. The latter is constructed in the known manner of, for example diode matrices and has a number of outlets equal to the number of outoing links, i.e., in the present case equal to 2,048. In dependence on the decoded address determined by the binary value from register OLA the binary value of the register SW is transmitted to the desired outgoing link in the channel for which coincidence with the clock register has been established, as described above in conjunction with FIG. 1.

We claim:

1. In a telecommunication system transmitting pulse code modulated time division multiplex signals, an intermediate exchange connecting arbitrary incoming pulse time position channels on incoming links with arbitrary outgoing pulse time position channels on outgoing links, said intermediate exchange comprising: a plurality of storage means, each of said storage means being connected to a different one of said incoming links, each of said storage means having a storage position for each of the incoming channels of the link, each of said storage positions having a first register for storing a pulse coded modulated binary information word, a second register for storing the address of the desired outgoing link for the associated binary information word and third register for storing the address of the desired outgoing channel for the associated binary information word; marker means for loading the desired outgoing link address and the desired outgoing channel addresses in the respective second and third registers; a clock register means for sequentially and cyclically generating each of the possible channel addresses; a plurality of channel address comparator circuits, each of said channel address comparator circuits having a first inlet connected to said clock register means and a second inlet connected to one of said third registers for storing a desired channel address whereby each third register of each link is connected to a different comparator circuit, each of said channel address comparator circuits including means for generating an activation signal upon detecting a predetermined relationship between the address received for said clock register means and the address stored in the associated third register; a plurality of selectively activatable decoder means, each of said decoder means being connected to one of said channel address comparator circuits for receiving activation signals therefrom and being connected to the first and second register associated with said channel address comparator circuit, each of said decoder means including means when activated for transferring the information word of its associated first register to an outgoing link indicated by the address word stored in its associated second register.

2. The intermediate exchange of claim 1 wherein each of said channel address comparator circuits includes means for performing an EXCLUSIVE-OR operation between the channel addresses from said clock register means and the channel address stored in the associated third register, said activation signal appearing on the outlet of said channel address comparator circuit if the two addresses are identical, and a logic AND-circuit controlled by said activation signal for passing the contents of the associated first and second registers to said decoder means.

* * * * *